Figure 1:
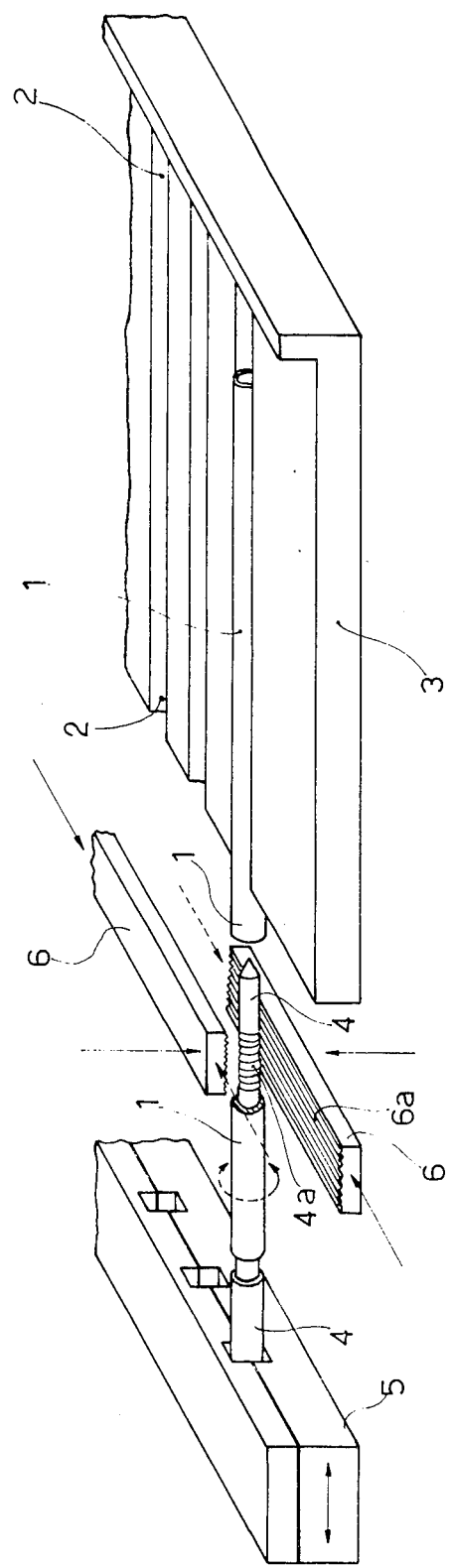

United States Patent [19]

Donati

[11] Patent Number: 4,613,474

[45] Date of Patent: Sep. 23, 1986

[54] PROCEDURE AND RELEVANT MECHANICAL APPARATUS TO OBTAIN THE FOLDING SECTION OF A PLASTIC DRINKING STRAW

[76] Inventor: Gino Donati, Via Carpignola, 64, Cattolica (FO), Italy

[21] Appl. No.: 689,603

[22] Filed: Jan. 8, 1985

[30] Foreign Application Priority Data

Jan. 13, 1984 [IT] Italy .................................. 602 A/84

[51] Int. Cl.⁴ .............................................. B29C 53/30
[52] U.S. Cl. .............................. 264/320; 198/803.12; 425/392; 493/463
[58] Field of Search ............... 264/320, 286, 296, 322; 493/463; 198/803.12; 425/392

[56] References Cited

U.S. PATENT DOCUMENTS

| | | | |
|---|---|---|---|
| 1,455,433 | 5/1923 | Ellrich | 198/803.12 |
| 2,631,645 | 3/1953 | Friedman | 493/463 |
| 2,985,077 | 5/1961 | Strahammer et al. | 493/463 |
| 3,012,604 | 12/1961 | Zieg | 264/286 |
| 3,021,245 | 2/1962 | Roberts et al. | 264/286 |
| 3,242,828 | 3/1966 | Larkin | 264/286 |
| 3,339,004 | 8/1967 | Nardone | 264/320 |
| 3,751,541 | 8/1973 | Hegler | 264/286 |
| 3,949,045 | 4/1976 | Hess et al. | 264/296 |
| 4,088,226 | 5/1978 | Vicek et al. | 198/803.12 |

FOREIGN PATENT DOCUMENTS 46-3668   1/1971   Japan .................................. 264/320

*Primary Examiner*—Willard E. Hoag
*Attorney, Agent, or Firm*—Leonard Bloom

[57] ABSTRACT

Method and apparatus for grooving a plastic drinking straw in which a straw is moved to an axially movable, rotatable, circumferentially grooved, pointed mandrel or pin then opposed grooved bars mating with grooves of the pin are pressed against the straw and moved in opposite directions lengthwise of the grooves of the bars.

8 Claims, 1 Drawing Figure

PROCEDURE AND RELEVANT MECHANICAL APPARATUS TO OBTAIN THE FOLDING SECTION OF A PLASTIC DRINKING STRAW

SUMMARY

The present invention concerns the procedure and relevant mechanical execution to obtain the folding section of a plastic drinking straw, by means of a series of small circular grooves, parallel to each other.

The grooves are obtained by making use of a technological procedure similar to rolling.

DESCRIPTION TEXT

The subject of the present patent application for an industrial invention, is the procedure, together with the relevant mechanical execution, for obtaining the folding section of a plastic drinking straw, by means of a series of small circular grooves parallel to each other all around the straw.

A similar type of straw, the commercial and functional importance of which is well known, is currently produced manually or by means of a highly complex industrial procedure, the execution of which is anything but economical and functional.

To obtain a straw with a folding section, thanks to which, as is well known, it can be folded in any direction of about 90° without damaging the passage section in the slightest, up to the present a procedure with the following phases has been used:

(a) positioning of a straw on a piston pin having a section fluted by a close series of circular parallel grooves, which is inserted precisely inside the straw;

(b) operation and closing of two semi-circular jaws capable of gripping the straw and having ribs parallel to each other on their internal surfaces, the profile and dimensions of which perfectly match those on the piston grip. To obtain a high productivity level, it is consequently necessary to operate on a large number of straws, each contained in the groove, positioned on the periphery of a large rotating drum, providing as many piston pins and jaw devices as the number of straws being processed.

The procedure briefly described above, although assuring a high quality finished product, is considerably limited by the necessity of making the two jaws rotate, since this action involves the execution of particularly complex and delicate machinery, due to the considerable number of parts in rotation.

To overcome this twofold disadvantage, it seemed necessary to substantially revolutionize the known procedure for the production of straws with a folding section, eliminating the rotating parts from the machinery and at the same time directing all efforts towards obtaining a higher productivity level from the machinery.

The new procedure, developed in consideration of the disadvantages of the previous system, and its mechanical execution are the subject of the present patent application for an industrial invention.

The invention is based essentially on the fact that the jaw action has been replaced by the rectilinear movement of two opposite horizontal grooved bars, in order to obtain the folding section of the straw.

In fact, the straw is nested in a piston pin free to turn idle, in a part of which there are some small circular grooves parallel to each other. Just in this area the pressing action is carried out by the rectilinear alternating and opposite movement of two bars which are orthogonal to the piston pin axis, against which they press the straw having longitudinal grooves, the profile of which matches that of the grooves of the piston pin itself. These bars, which are maintained at an ideal temperature, form the folding section of the straw which turns idle together with the piston pin. The whole process is similar to rolling which is normally used for obtaining threaded bars or screw threads.

For a more detailed explanation the description of the invention continues with reference to the attached drawing which is only for illustrative and not restrictive purposes.

FIG. 1 is the axonometric schematic representation of the mechanism for the execution of the procedure in question.

With reference to the attached drawing, it should be noted that, according to the procedure which is the subject of the present patent application, each individual straw (1) is placed on a support groove (2), provided in a metal plate (3), which houses a section of the whole length of the straw; inside the straw (1) a piston pin (4) with a point for centering the straw is subsequently inserted; the piston pin is mounted on a slide (5) which has the possibility of moving forwards and backwards on the horizontal plane while keeping the piston pin (4) coaxial to the straw (1).

It should be specified as regards this last point that the piston pin (4) has the pecularity of being able to rotate idle and that in the area near the point it has some small circular grooves parallel to each other (4a). Corresponding to these grooves (4a) on the piston pin, and above and below it, two bars (6) are positioned on parallel planes, in diametral opposition to each other and orthogonal to the axis of the piston pin itself (4). The bars are longitudinally fluted by grooves (6a) with profiles matching those of the grooves (4a) of the piston pin (4). These bars (6) which are kept at a suitable temperature to make the plastic of the straw (1) more malleable without however melting it, are brought closer to the straw itself (1) until they embrace it, so as to press it against the piston pin (4). Subsequently they are translated parallely by means of an alternating and opposite movement able to draw the straw (1) and the piston pin (4) in rotation together; the straw is integral with the piston pin thanks to the pressure exerted by the bars.

At this point, taking into consideration that both the straw (1) and the piston pin (4) rotate idle, it is easy to understand how the straw (1) is marked all around by the grooved profile of the bars (6) thanks to the matching grooves (4a) of the piston pin (4). On conclusion of the movement of these bars (6), a perfect folding effect on the body is obtained.

Once this action is completed the two bars (6) move away from the piston pin, which first of all moves forward sufficiently to contract folding, then withdraws to extract itself from the straw (1). This extraction is assisted by a special pneumatic blow.

Finally it should be noted that since the plate (3) is fitted with a large number of support grooves (2), with a corresponding number of piston pins (4) able to move forward together, penetrating the same number of straws (1), providing bars (6) with a suitable length, numerous finished products can be obtained simultaneously.

I claim:

1. A method for forming the folding section of a plastic drinking straw comprising, supporting a plastic straw on a grooved support plate, inserting a freely rotatable piston pin having parallel circular grooves and a point for centering the straw into the plastic straw, lengthwise moving opposed forming bars having lengthwise grooves in facing surfaces, said facing surfaces being complementary to the grooves of the piston pin, and moving the bars orthogonal to the piston pin and in opposite directions at least once while said bars are in contact with a straw positioned on said piston pin thereby causing free rotation of the piston pin and formation of the folding section, retracting the forming bars, and removing the straw from the piston pin.

2. The method of claim 1 wherein the piston pin rotates freely.

3. Apparatus for grooving a drinking straw, comprising: a grooved support plate for holding a straw; a circumferentially grooved, axially movable, freely rotatable, piston pin; two forming bars movable into contact with a straw mounted on said pin, said bars having longitudinally grooved facing surfaces complementary with grooves of said pin, said bars being movable lengthwise while said grooved surfaces are in contact with a straw mounted about the pin to form grooves in the straw.

4. The device of claim 3 wherein the piston pin has formed therein a point for piloting the insertion of the piston pin into a plastic drinking straw and circumferential circular grooves.

5. The device of claim 4 wherein the forming bars are movable into a parallel relationship in contact on opposite sides of the plastic straw and thereafter advanced in directions orthogonal to the long axis of the piston pins and in opposite directions to one another.

6. The device of claim 5, wherein the only direction of translation for the piston pin in along its long axis.

7. The device of claim 6 wherein the forming bars are movable into contact with the straw on the piston pin, and away from the straw on the piston pin in a linear fashion.

8. The device of claim 7 wherein the forming bars are movable in opposite directions, orthogonally to the workpiece in a reciprocating fashion, thereby forming the folding section by rotating the piston pin in opposite directions.

* * * * *